United States Patent [19]

Laux

[11] 4,048,754
[45] Sept. 20, 1977

[54] WINDOW BOX PLANTER WITH TOOL-FREE QUICK SET-UP AND HANGING ADJUSTMENT

[76] Inventor: Leon E. Laux, 900 Fairway Drive, Towson, Md. 21204

[21] Appl. No.: 703,538

[22] Filed: July 8, 1976

[51] Int. Cl.² .............................................. A01G 9/02
[52] U.S. Cl. ......................................... 47/68; 211/104; 220/4 F; 217/12 R; 217/65
[58] Field of Search ................. 47/40, 68; 211/104 R, 211/104 F; 220/4 F; 217/12 R, 12 A, 5, 65

[56] References Cited

U.S. PATENT DOCUMENTS

| 160,088 | 2/1875 | Eby | 217/5 |
|---|---|---|---|
| 187,771 | 2/1877 | Piaget | 47/68 |
| 816,629 | 4/1906 | White | 217/12 R |
| 919,478 | 4/1909 | Simpson | 217/5 |
| 1,233,981 | 7/1917 | Cerveny | 217/12 A |
| 1,353,853 | 9/1920 | Sandberg | 47/40 |
| 2,019,407 | 10/1935 | Graves, Jr. | 47/19 |
| 2,257,536 | 9/1941 | Roycroft | 220/4 F X |
| 3,316,460 | 4/1967 | Scoville | 220/4 F |
| 3,331,524 | 7/1967 | Wiley, Jr. | 220/4 |
| 3,696,960 | 10/1972 | Smirle | 220/4 R X |

FOREIGN PATENT DOCUMENTS

| 460,145 | 9/1912 | France | 217/12 R |
|---|---|---|---|
| 1,180,303 | 10/1964 | Germany | 220/4 F |
| 723,046 | 2/1955 | United Kingdom | 217/12 R |

*Primary Examiner*—E. H. Eickholt

[57] ABSTRACT

A plant-holding type window box has wedge-tight spring-lock assembly-securance system providing rapid, tool-less set-up for use and knockdown for shipping or storage; plural hangers incrementally adjust in pre-spaced holes and screw-adjust in depth in coaction with screw adjustable stand-offs to mount the unit securely to all usual building-structure configurations; conveniently large and accessible assembly wedges so-relate visually to the wall members that the wall structure as a whole appears unitary when assembled; economical straight-cut fabrication is employed throughout to hold all edges of two-level plant pot holding structure.

13 Claims, 14 Drawing Figures

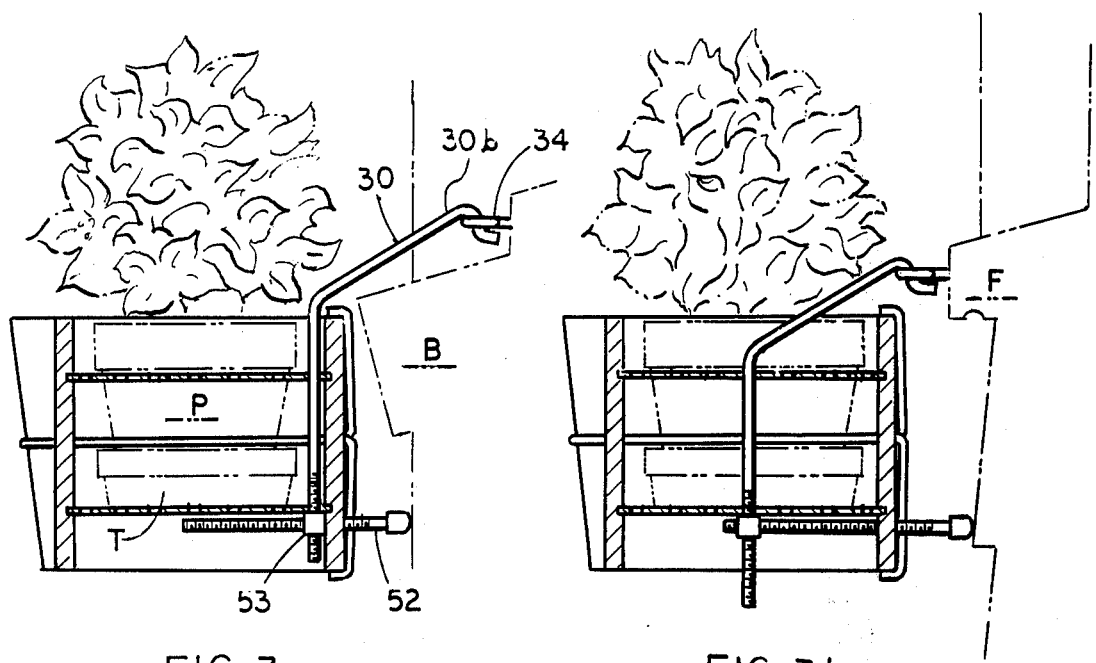
FIG. 3a
(RECESSED SILL MOUNTING)
FIG. 3b
(EXTENDED SILL MOUNTING)
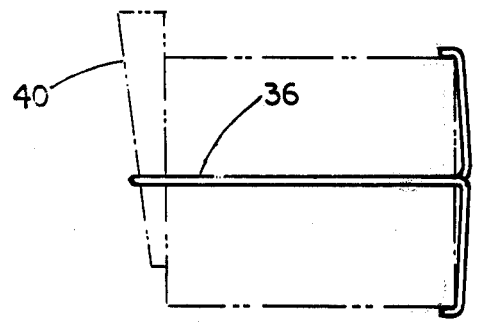
FIG. 4
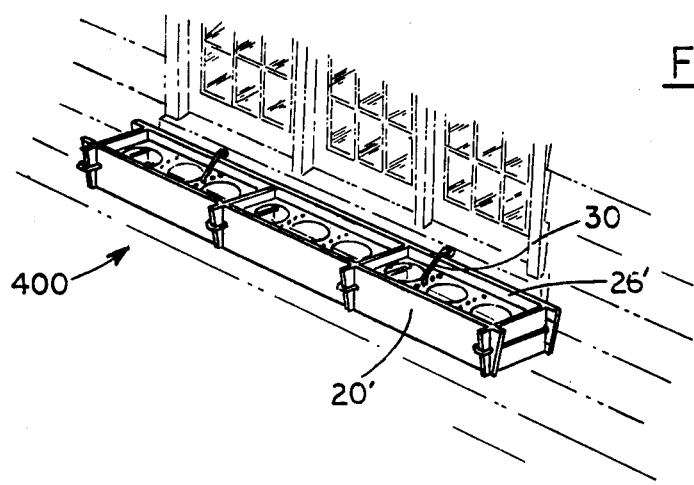
FIG. 5

WINDOW BOX PLANTER WITH TOOL-FREE QUICK SET-UP AND HANGING ADJUSTMENT

This invention relates generally to plant holding apparatus and specifically to window boxes.

In the prior art various disclosures appear; in particular, some U.S. Pat. Nos. teach as follows:

1,353,853 to A. P. Snadburng, Sept. 28, 1920, discloses screw-adjustable metallic window-box-holding and standoff members;

2,019,407 to W. C. Graves, Jr., Oct. 29, 1935, discloses perforate tray structure;

2,696,960 to James M. Smirle, Oct. 10, 1972; discloses modular box structure.

3,331,524 to N. C. Wiley, Jr., July 18, 1967, discloses a pot holding window box;

However, no combination of the prior art appears to make fair suggestion of the present invention as below set-out.

Principal objects of this invention are to provide a window box which integrates strong, safe, convenient, quick assembly securances into overall design of pleasing, versatile appearance, to provide a unit as described which sets-up and knocks down flat for storage or shipping, without tools, which adjusts for installation on and against various styles and sizes of windows without tools, which is easily cleaned, which holds plants securely, which gives visual evidence of proper assembly, and which is durable, economical to manufacture and sell, and which is simple, easy and safe for almost anyone to set up and install.

In brief summary given for cursive description purposes only and not as limitation, the invention includes a window-box having upright wall structive and horizontal structure secured together upon assembly by wedge structure, and adjustable hanging and stand-off means, all providing tool-free set up and adjustment upon installation.

The above and other objects and advantages of this invention will become more readily apparent on examination of the following description, including the drawings, in which like numerals refer to like parts:

FIGS. 3a and 3b are sectional views adapted from 3—3, FIG. 1;

FIG. 4 is an isometric detail of a second embodiment;

FIG. 5 is a side elevational detail;

Figure 6:
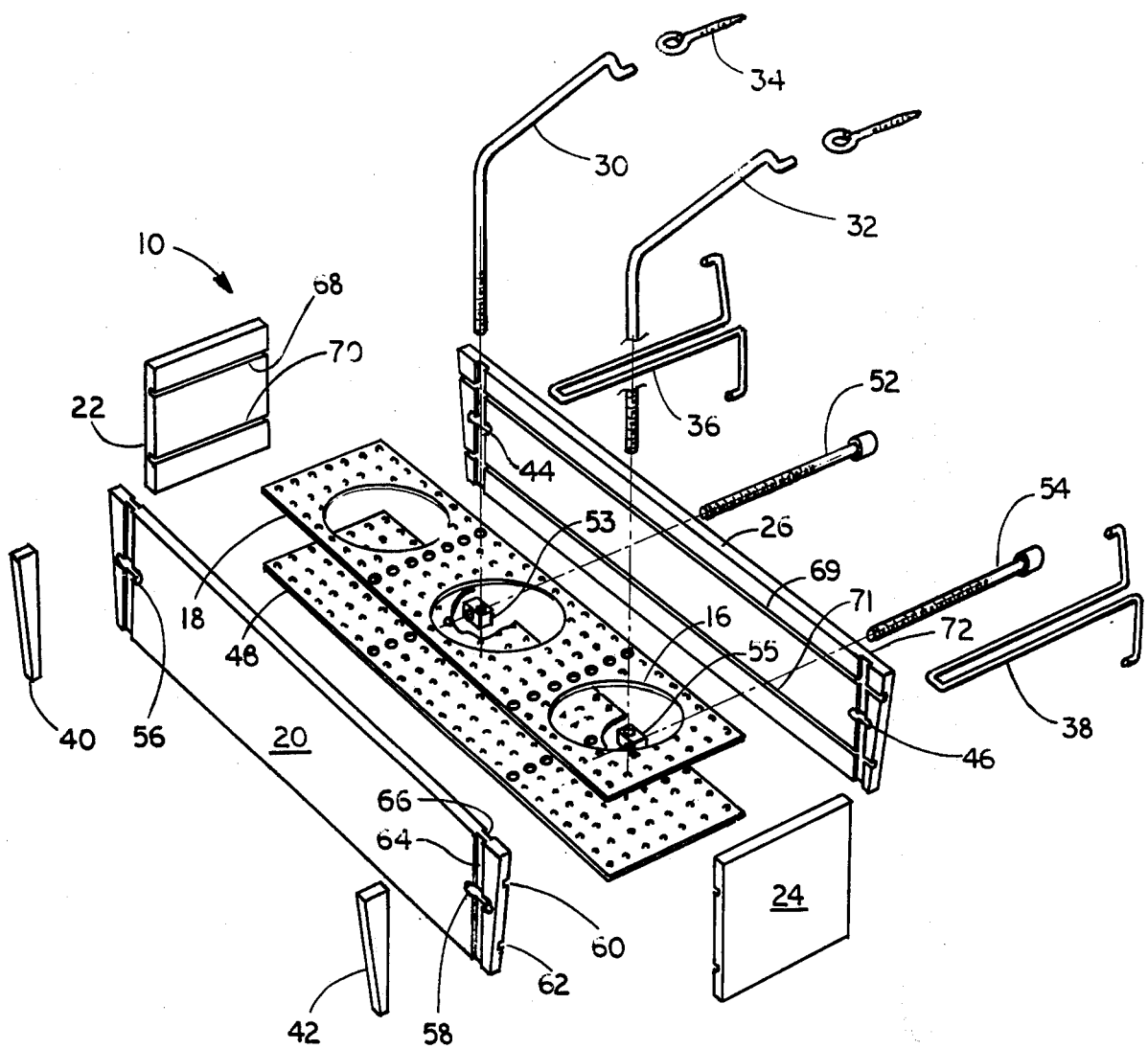
Figure 7:
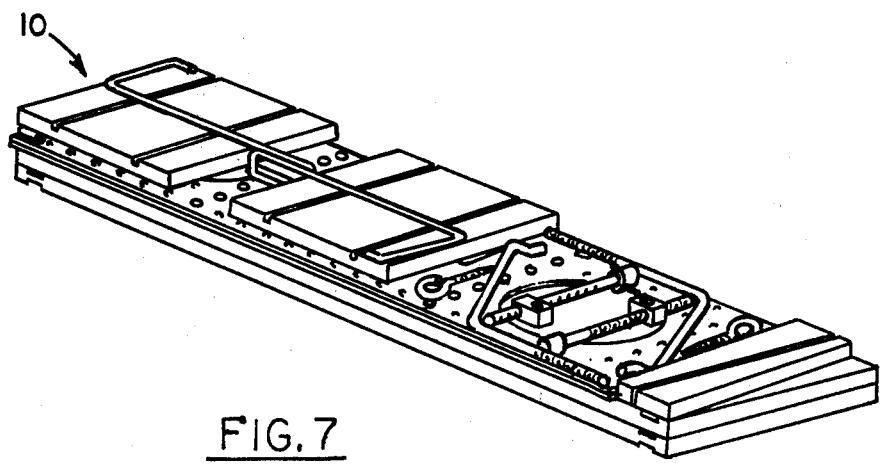

FIG. 6 and the remaining Figures continue with the first embodiment; FIG. 6 being an exploded isometric view;

FIG. 7 is an isometric view showing the invention disassembled for shipment or storage; and FIGS. 8a through 8f are isometric details of successive stages of assembly.

Figure 1:
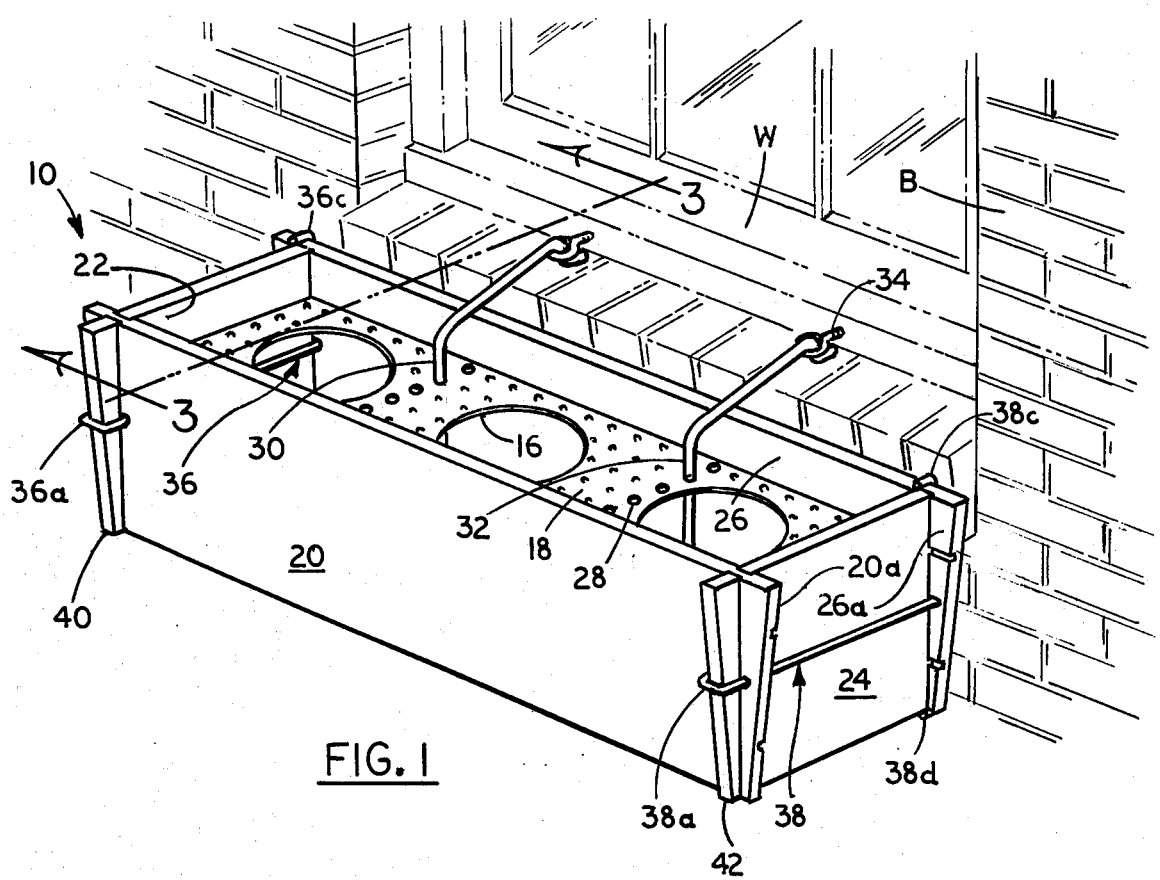
FIG. 1 is an isometric view of the invention installed at the window at a building.

FIG. 1 shows the invention 10 assembled and installed at the windowsill W of a building B, ready for receiving plants in pots in circular recesses 16 spaced longitudinally in upper tray 18 which is supported at the edges in grooves is a rectangular frame formed by upright front wall 20, end walls 22, 24 and rear wall 26.

The tray preferably has a grid of small perforations 28, on the order of 3/16 inch (4.6 mm) diameter, through which two or more metallic rod hangers 30, 32 extend upwardly and then to the rear where they engage respective eye screws 34 horizontally fixed in the vertical face of the windowsill. Preferably the rod hangers are of ¼ inch (6 mm) diameter material, with the holes through which they pass and adjacent adjustment holes enlarged accordingly.

At each end of the window box, a rod-type spring 36, 38 of generally "T" shape as viewed in window box end-aspect, each with a shank loop 36a, 38a at the bottom of the stem and on each hooked end 36c, (36d not shown), 38c, 38d extends through the front and back walls and is secured in front by a wedge 40, 42 tapered front-to-back, small end at the bottom. The wedge is exactly as long as the walls are high. The ends of the front and rear walls by design have an overhang 20a, 26a of the same slope and extension as the tapers, giving a unitary appearance, converting the functionally large size and prominent location of the wedges to an attractive design feature.

Figure 2:
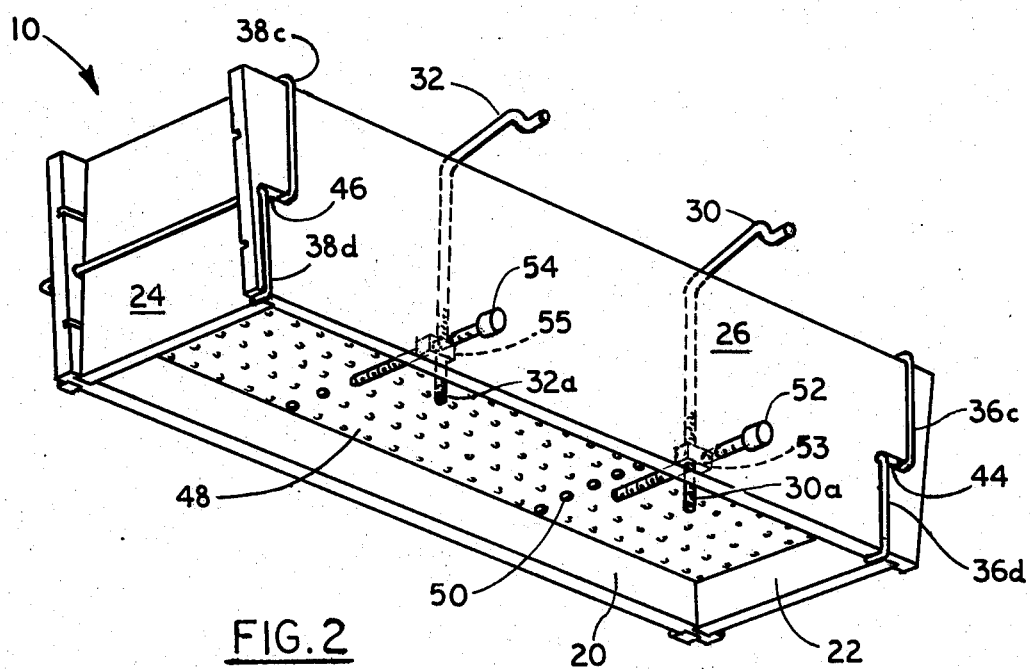
FIG. 2 is an isometric view from below and behind the invention.

FIG. 2 shows the rear aspect, in which it better appears that the loop shank portion of each spring extends through horizontal slots 44, 46 through the rear wall 26 and similarly through the front wall 20 and holds a respective end wall 22, 24 in the loop, the respective hook ends of each supportingly engaging the top and bottom respectively of the rear wall so that the rear wall slot is not loaded. It will be appreciated that all loads are in line and that no bending load is applied to any unsupported structure.

A lower tray 48 is provided, with a grid of holes 50 matching that of the upper tray, and is similarly held at the edges in grooves in the walls, in parallel vertical spacing from the upper tray.

The hangers 30, 32 shown in the previous Figure pass down also through corresponding holes in the lower tray where they terminate in respective screw-threaded ends 30a, 32a which adjustably engage respectively threaded blocks 53, 55 beneath the lower tray.

Screw-threaded stand-offs 52, 54 with broad-contact rubber or plastic heads pass horizontally through the rear wall 26 and adjustably engage the respective threaded blocks.

FIG. 3a taken at 3—3, FIG. 1 shows the relation of the hanger structure 30 threaded block 53, and standoff 52 when applied to a recessed-sill or brick-type building window sill as in the first Figure. The hander is positioned in perforations in the respective upper and lower trays near the back wall so that the downward flared-hook 30b on the end of the hanger reaches the eye screw 34 across the portrusive building structure B; the standoff is screw-adjusted short, accordingly. The downward flared-hook turns down almost 90 degrees from the approximately 30° davit upslope as it passes through the horizontal screw-eye, and then flares out to an almost horizontal terminus.

This hanger structure prevents accidental unhooking, since the window box assembly must be rotated up almost 90 degrees to detach it, but makes attachment and detachment easy, since the terminus passes readily through the eye-screw at this angle. Plant-pots P are removed for attaching and detaching the unit, but drip pans or moisture trays T may be left in place on the low tray.

The bottom of the lower tray is safely backstopped against pulling out should it sag under excessive load by the horizontal projection of the standoff to the center of the window box, and this same projection also supports the back wall and provides for adjustment of the hanger as in the next Figure.

FIG. 3b shows the hanger and standoff adjusted to fit an extended windowsill structure F, such as those used in framebuilding construction. The hanger is shown inserted through holes more central of the upper and lower trays, and adjusted lower by screwing farther through the threaded block. If desired, more than two hangers can be employed, the upwardly oblique davit-angle making it practical to swing them past each other in screw adjusting even when they are in adjacent holes. If desired, in some cases the threaded block can first be screwed to position on the hanger and then the standoff can be screwed into it, as will be seen.

FIG. 4 shows multiple hangers 30 supporting embodiment 400 longitudinally extended by having front and back walls, 20' and 26', continued for the length of plural units, the remainder of the structure being identical. This arrangement preserves the effective appearance, the straight-cut simplicity of fabrication, and the interchangeability of most parts while providing a soundly buttressed, strong and rigid overlength unit for plural-window uses such as that shown. Lateral swing of the hangers is available to increase tolerance in eye-screw location.

FIG. 5 illustrates a further feature of the invention relative to the rod springs, 36 shown, which preferably have circular cross-sections. Each spring is given a pre-set such that the cross arms of the T incline toward the shank slightly from the perpendicular. When the respective wedge 40 is forced down, uniting the assembly simply but under great mechanical advantage, it draws the spring loop-shank flexing the cross arms to a position perpendicular to the shank, so that the spring acts as a kind of lock-washer, insuring that wind vibration, heat and cold, and swelling and shrinking will not loosen the wedge. The resilience provided by the spring also tends to prevent jamming, so that the wedge can be removed when desired. It is evident as a safety feature that the wedge cannot drop out even when loose, since the upper end is larger, and that any looseness will be immediately visible from all angles since, when loose the top and bottom of the wedge will show as misaligned with the top and bottom of the front and the end walls.

FIG. 6 shows the assembly relations of the window box 10 in exploded view. There are only eight wood-type parts (which may be plastic or other suitable materials), the upper and lower trays 18, 48, which may be of perforate "Masonite" type toolboard, available in standard ⅛ inch thickness, the front wall 20 which ha horizontal grooves 60, 62 for the trays, and the wedges 40, 42; the end walls 22, 24 which have horizontal grooves 68, 70 for the trays, and the rear wall 26 which has slots 44, 46 corresponding to the front-wall slots for the spring shanks, horizontal grooves 69, 71 for the trays, and vertical grooves 72 for the end walls. The only curves are those at the plant holder cutouts 16.

The metallic parts may be appropriate grades of aluminum or brass, but may advantageously be steel, galvanized and plastic covered except at the threads, and of 3/16 inch (4.6 mm) diameter in the case of the springs.

The metallic parts include, as noted, the springs 36, 38, the hangers 30, 32, the eye screws 34, the standoffs 52, 54 and the threaded blocks 53, 55.

FIG. 7 shows the invention 10 knocked-down for compact shipment in a flat box, or for storage. It will be noted that this feature makes the unit ideal for mail order and forseasonal display use as in garden shops and department stores.

Figure 8A:
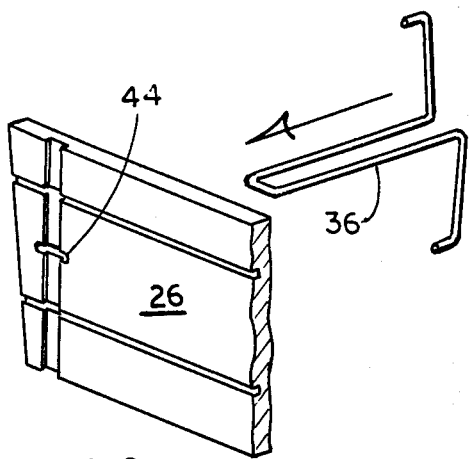

FIGS. 8a through 8f show in sequence preferred assembly steps:

FIG. 8a: the shank of each spring 36 (as shown) is first passed through a respective slot 44 in the rear wall 26.

Figure 8D:
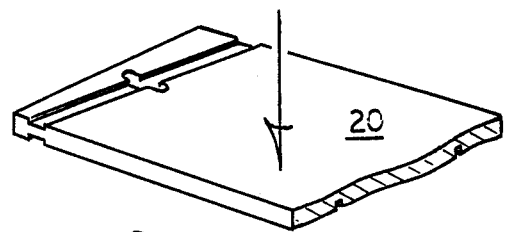
Figure 8D:
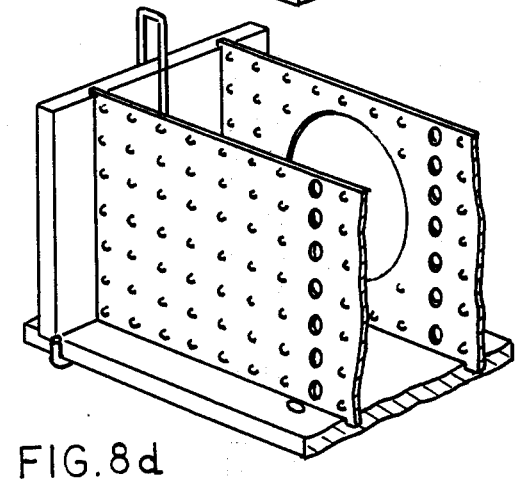
Figure 8B:
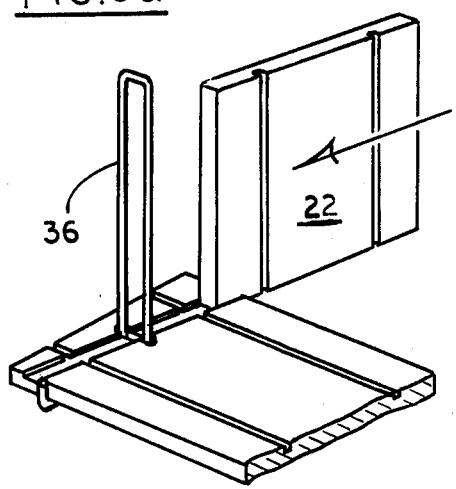
Figure 8E:
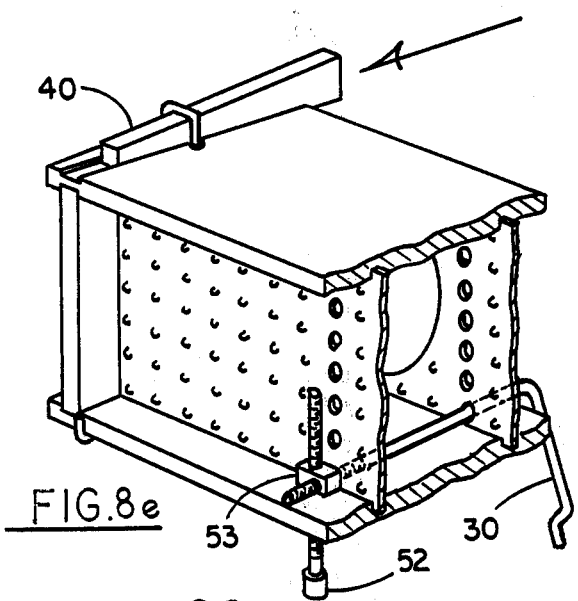
Figure 8C:
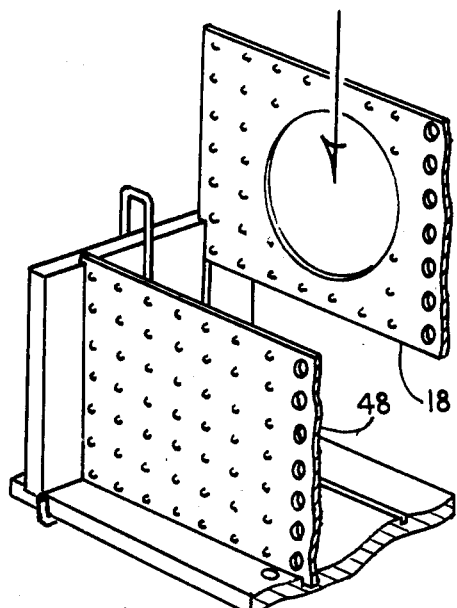
Figure 8F:
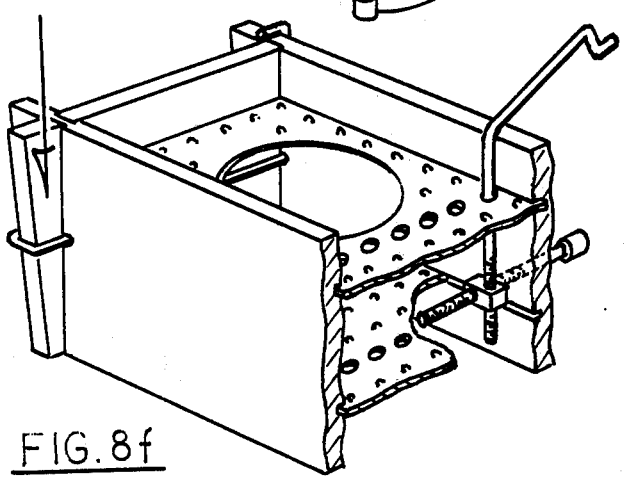

FIG. 8b: each end wall, 22 shown, is next pushed between the supportively fitting shank loops of a respective spring 36, with the rear wall resting on the back face to hold the springs in upright extension from the rear wall;

FIG. 8c: the upper tray 18 and lower tray 48 are next slid into the grooves in the end walls and back wall;

FIG. 8d: the front wall 20 is fitted over the springs and in supportive groove-engagement with the trays;

FIG. 8e: the wedges, 40 shown, are inserted in the protrusive spring loops and the hangers and standoffs 30, 52 shown, are attached by means of the threaded blocks 53 shown, FIG. 8f: the window box is stood on the bottom and the wedges are pressed home even with the top and bottom as by stepping on the wedges.

Alternatively, the wedges can be tapped in place with a hammer or block of wood.

Disassembly requires merely reversing the sequence, and like assembly requires only two or three minutes. The assembled unit is so securely held that it gives a resonant note when struck, will not loosen when dropped, is pleasing to handle, is sufficiently well proportioned and integretaed in appearance to make tampering with the wedges unlikely, is easily cleaned and well ventilated and drained, and is generally light in weight and pleasing to handle.

Prior to assembly, either of the trays can be used as a template for marking eye screw locations at the window, using the appropriate holes, through which a marker can be extended.

It is evident that part of the principle of the invention could be practiced by having only the end walls or only the trays between the front and back walls, to give the spring and wedge something to draw against but it is equally evident that the preferred embodiment is that basically described.

This invention is not to be construed as limited to the particular forms disclosed herein, since these are to be regarded as illustrative rather than restrictive. It is, therefore, to be understood that the invention may be practiced within the scope of the claims otherwise than as specifically described.

What is claimed and desired to be secured by United States Letters Patent is:

1. In a window box having front, back and end walls, plant holding means, and hanging and standoff means, the improvement comprising: at least one of the end walls and plant holding means being between the front and back walls for securance thereto, a member proximate each end of the window box extending horizontally thereacross, means for wedging one end of a said member for supportively drawing the front and back walls toward each other and thereby effecting said securance, the means for wedging including said member having a shank extending through the front and back walls, a wedge, means at the first end of the shank for engagement by the wedge, and mean at the second end of the shank for preventing the shank from being drawn through.

2. In a window box a recited in claim 1, said means for engagement including a loop in the shank, and a respective end wall being within the loop in the shank and between the front and back walls.

3. In a window box as recited in claim 2, the wedge having a large end tapering out from the front wall.

4. In a window box a recited in claim 3, the wedge having at least one end even with a vertical extent of the front wall, the front wall having extension beyond the end wall proximate the wedge and having an incline at the proximate front wall end corresponding to the wedge taper.

5. In a window box as recited in claim 4, the wedge and front wall being coextensive in height and the proximate back wall end having an incline corresponding to the wedge taper.

6. In a window box as recited in claim 5, the means at the second end of the shank including the shank loop having at the rearward end vertically extending structure engaging the back wall, the vertically extending structure forming less than a right angle with the shank, the wedge being proportioned for resiliently drawing the vertically extending structure toward an angle perpendicular to the shank upon assembly.

7. In a window box as recited in claim 6, the plant holding means including an upper and a lower tray, the front and back walls having grooves for receiving edges of all said trays and end walls and the end walls having grooves for receiving edges of all said trays.

8. In a window box as recited in claim 1, the plant holding means comprising an upper tray and a lower tray, means securing all said trays, each of the trays having a multiplicity of laterally spaced holes therethrough.

9. In a window box as recited in claim 8, hanging means having a laterally tending portion for detachable securance to additional structure, and a vertically tending portion therefrom adjustably positionable downwardly through respective holes in the upper tray and the lower tray, and means for securing the lower end of the vertically tending portion.

10. In a window box as recited in claim 9, the additional structure comprising horizontal eye-type structure, and the hanging means having at the upper end a downward hook flaring out toward the horizontal at the terminus.

11. In a window box as recited in claim 10, the means for securing the lower end including a threaded terminal portion thereof, a threaded block engageable with the threaded terminal portion in height adjustable relation, and a standoff having projection beyond the back wall and adjustable connection with the threaded block.

12. In a window box as recited in claim 11, the standoff projecting through the rear wall.

13. In a window box as recited in claim 6, a first end of the vertically extending structure extending to the upper edge of the back wall and having a portion forwardly extending thereover, and a second part of the vertically extending structure extending to the lower edge of the back wall and having a portion forwardly extending thereunder, all said forwardly extending portions securing the back wall therebetween.

* * * * *